United States Patent [19]

Kanehira

[11] Patent Number: 5,772,093
[45] Date of Patent: *Jun. 30, 1998

[54] METHOD AND APPARATUS FOR SPLITTING A CATHODE RAY TUBE

[75] Inventor: Kouzi Kanehira, Chiba, Japan

[73] Assignee: Sony Corporation, Japan

[*] Notice: The term of this patent shall not extend beyond the expiration date of Pat. No. 5,556,018.

[21] Appl. No.: 618,201

[22] Filed: Mar. 19, 1996

Related U.S. Application Data

[63] Continuation of Ser. No. 265,768, Jun. 27, 1994, Pat. No. 5,556,018.

[30] Foreign Application Priority Data

Jul. 9, 1993 [JP] Japan ................. P05-170518

[51] Int. Cl.⁶ ..................................... H01J 9/50
[52] U.S. Cl. ..................... 225/2; 225/93.5; 445/2
[58] Field of Search ............. 225/2, 93.5; 65/174, 65/DIG. 4; 445/2

[56] References Cited

U.S. PATENT DOCUMENTS

| | | | |
|---|---|---|---|
| 2,116,129 | 5/1938 | Stringer | 445/2 |
| 2,884,312 | 4/1959 | Kuryla | 65/23 |
| 3,157,328 | 11/1964 | Hennings et al. | 225/93.5 |
| 3,744,359 | 7/1973 | Gelfman | 225/93.5 |
| 3,839,006 | 10/1974 | Pikor | 225/93.5 |
| 4,190,184 | 2/1980 | Oelke et al. | 225/93.5 |
| 4,255,216 | 3/1981 | Conant et al. | 225/93.5 |
| 4,368,064 | 1/1983 | Siegel | 225/93.5 |
| 4,424,925 | 1/1984 | Runayor-Aguirre et al. | 225/93.5 |
| 5,252,113 | 10/1993 | Jung et al. | 225/93.5 |
| 5,439,406 | 8/1995 | Fuwa et al. | 445/2 |
| 5,556,018 | 9/1996 | Kanehira | 225/93.5 |

FOREIGN PATENT DOCUMENTS

| | | | |
|---|---|---|---|
| 499498 | 1/1954 | Canada | 225/93.5 |
| 2619731 | 3/1989 | France | 225/93.5 |
| 4313157 | 2/1994 | Germany | 445/2 |

OTHER PUBLICATIONS

"Automatic crack-off machine for a cathode ray tube" RCA tech. notes, Nov. 195.

Primary Examiner—Kenneth E. Peterson
Attorney, Agent, or Firm—Ronald P. Kananen

[57] ABSTRACT

A scratch is made at least at one corner portion of the cathode ray tube and heat is applied so as to flank the scratch from the two sides. More specifically, electrical heating wires are disposed at the two sides of the scratch formed on the cathode ray tube and the electrical heating wires are used to apply the heat in a linear manner from the two sides of the scratch. Preferably, scratches are formed at the four corners positioned at the panel portion rather than the frit glass portion where the panel portion and the funnel portion of the cathode ray tube are joined, electrical heating wires to which tension is applied are disposed at the four corner positions of the panel portion so as to flank the scratches from the two sides, and heat is applied to the cathode ray tube by the electrical heating wires. Tension is applied to the electrical heating wires by springs.

8 Claims, 8 Drawing Sheets

SCRAP CRT

SPLITTING

SPLITTING APPARATUS 2

REMOVAL

FUNNEL 7a

PANEL 5a

METHOD AND APPARATUS FOR SPLITTING A CATHODE RAY TUBE

This application is a continuation of application Ser. No. 08/265,768 filed Jun. 27, 1994, now U.S. Pat. No. 5,556,018.

BACKGROUND OF THE INVENTION

1. Field of the Invention

The present invention relates to a method and apparatus for splitting a cathode ray tube, more particularly to a method and apparatus for splitting a cathode ray tube which enable for example scrap cathode ray tubes to be split by a simple apparatus easily and at low cost and thus enable reutilization of resources.

2. Description of the Related Art

A cathode ray tube is comprised of a panel portion and funnel portion bonded together by frit glass (solder glass). The panel portion is the portion on which the picture is displayed and must be more strictly controlled in composition compared with the glass making up the funnel portion. For example, the funnel portion includes lead for the purpose of improving the X-ray absorbing characteristic, but if the panel portion includes more than a predetermined amount of lead, a browning phenomenon occurs, so the content is limited.

Therefore, to promote the reutilization of reclaimed cathode ray tubes (scrap cathode ray tubes), work is required to separate the panel portion and the funnel portion.

As a method for reutilization of cathode ray tube glass in the prior art, there has been known the method of smashing the cathode ray tube glass by a hammer, washing the pieces, then manually separating the pieces of the panel portion and the pieces of the funnel portion so as to reutilize the cathode ray tube glass.

However, in this conventional method, there were the problems that a hammer was used to manually smash the cathode ray tube and manual work was used for the separation after smashing, so there was attendant danger to the workers and the work of manual separation was complicated.

Further, there has been known a method of immersing the cathode ray tube into nitric acid or another chemical to dissolve the frit glass portion of the cathode ray tube, split it into the panel portion and funnel portion, and separately reutilize the glass of the panel portion and the glass of the funnel portion.

In this method, however, there was the problem that a chemical was used, the safety control of the chemical was complicated, and large facilities such as wastewater treatment facilities and waste duct facilities were required. It is desirable to find a method for reutilization of cathode ray tube glass by a simpler apparatus or facility.

SUMMARY OF THE INVENTION

The present invention has been made in consideration of this situation and has as its object to provide a method and apparatus for splitting a cathode ray tube which enable for example scrap cathode ray tubes to be split by a simple apparatus easily and at low cost and enable reutilization of resources.

To achieve the above-mentioned object, the method for splitting a cathode ray tube of the present invention comprises the steps of making a scratch at least at one corner of the cathode ray tube and applying heat in a linear manner so as to flank the scratch from the two sides.

In the above-mentioned method of splitting, it is preferable that electrical heating wires be disposed at the two sides of the scratch formed on the cathode ray tube and the electrical heating wires be used to apply the heat in a linear manner from the two sides of the scratch.

In the above-mentioned method of splitting, it is further preferable to form scratches at the four corners positioned at the panel portion rather than the frit glass portion where the panel portion and the funnel portion of the cathode ray tube are joined, dispose electrical heating wires to which tension is applied at positions at the four sides of the panel portion so as to flank the scratches from the two sides, and apply heat to the cathode ray tube by the electrical heating wires.

To achieve the above-mentioned object, further, the apparatus for splitting a cathode ray tube of the present invention comprises linear heating elements disposed so as to flank scratches formed at the four corners of the cathode ray tube from the two sides and so as to contact the four sides of the cathode ray tube and heat the portions of contact with the cathode ray tube and springs giving tension to the linear heating elements.

In the above-mentioned splitting apparatus, the linear heating elements preferably further comprise slide movement means for sliding them in a direction perpendicular to the longitudinal direction.

In the above-mentioned splitting apparatus, preferably insulation members are attached at the portions where the above-mentioned linear heating elements intersect.

In general, glass is strong against compressive stress, but is weak against tensile stress. Accordingly, glass easily cracks at portions with a large tensile stress. In the method of splitting of a cathode ray tube (glass) according to the present invention, the corners of the cathode ray tube are scratched and heat is applied to the scratches so as to flank them from the two sides, so the tensile stress becomes maximum at the corners of the cathode ray tube (scratched portions) and cracks occur in the cathode ray tube from the scratched portions. After this, the cracks gradually spread along the electrical heating wires or other linear heating elements from the inner side of the cathode ray tube where the tensile stress becomes larger and in the end the cathode ray tube splits.

In the method of the present invention, it is possible to split the cathode ray tube at any position, but to promote the reutilization of separate resources of the panel portion and the funnel portion of the cathode ray tube, it is desirable to split it at the panel portion side rather than the frit glass portion where the panel portion and the funnel portion of the cathode ray tube are joined. If split at the frit glass portion or the funnel glass portion, there is residual glass constituting the frit glass portion or the funnel glass portion (in general containing lead for improving the X-ray absorption characteristic) in the panel portion glass side after the splitting and there is a possibility that reutilization as glass for the panel portion will become difficult. If the glass constituting the panel portion contains more than a predetermined amount of lead, a browning phenomenon occurs, which is not desirable.

In the method of the present invention, it is preferable to scratch the four corner portions because the splitting process becomes easier than when scratching three corners or less.

The splitting apparatus of the present invention is simple in construction, so is transportable, easy to operate, and low in cost.

Further, in a splitting apparatus of the present invention wherein the linear heating elements further comprises slide movement means for slide movement in a direction perpendicular to the longitudinal direction, it is possible to bring the linear heating elements into contact with four side positions of the cathode ray tube in accordance with the size of the cathode ray tube, which makes things more convenient.

In the splitting apparatus of the present invention wherein insulation members are attached at the portions where the linear heating elements intersect, it is possible to effectively prevent short-circuiting among linear heating elements.

BRIEF DESCRIPTION OF THE DRAWINGS

Other objects and features of the present invention will be described in detail with reference to accompanying drawings, in which.

DESCRIPTION OF THE PREFERRED EMBODIMENTS

Below, an explanation will be made of a first embodiment of the present invention with reference to the drawings.

Figure 1A:
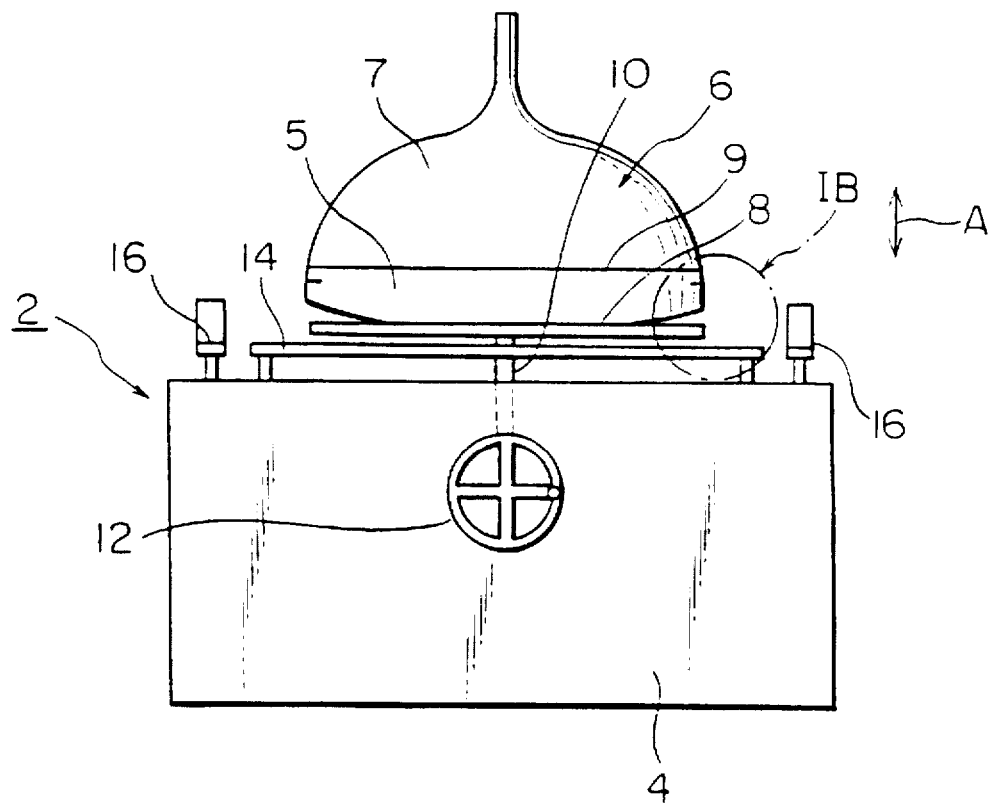
FIG. 1A is a front view of an apparatus for splitting of a cathode ray tube according to one embodiment of the present invention.

First, an explanation will be made of the apparatus for splitting a cathode ray tube according to one embodiment of the present invention. As shown in FIGS. 1 and 2, the cathode ray tube splitting apparatus 2 according to the embodiment of the present invention has a support base 4. On the support base 4 is attached an elevating plate 8 for carrying a cathode ray tube 6 to be split which can be moved up and down in the vertical direction "A". The elevating plate 8 is loaded with the cathode ray tube 6 to be split, then is lowered to a position where it is set so that the later mentioned electrical heating wires 22 (example of linear heating elements) contact four side positions of the panel portion 5 of the cathode ray tube 6.

The cathode ray tube 6 has a panel portion 5, a funnel portion 7, and a frit glass portion 9 joining the two. The funnel portion 7 and the frit glass portion 9 are generally comprised of a glass including lead, but the glass constituting the panel portion 5 is comprised of a glass of a composition different from the funnel portion 7 since use of a glass containing lead would cause a browning phenomenon.

The elevating plate 8 is connected to an elevating rod 10. A handle 12 is operated to control the vertical movement of the elevating plate 8 with respect to the support base 4. On the top surface of the support base 4 are disposed guide rails 14 and 16 corresponding to the outer circumferences of the four side positions of the cathode ray tube 6. The guide rails 14 and 16, as shown in detail in FIG. 2B, each have a pair of sliding pieces 18 (corresponding to slide means) attached slidingly along the longitudinal axes X and Y of the guide rails 14 and 16, respectively.

Each of the sliding pieces 18 is connected through a spring 20 to one of the ends of an electrical heating wire 22. The other end of the electrical heating wire 22 is attached through a spring 20 to another sliding piece 18 attached to another guide rail 14 or 16. As an end result, the electrical heating wires 22 are disposed so as to surround the four sides of the cathode ray tube 6 in a state with tension given by the springs 20.

Figure 2A:
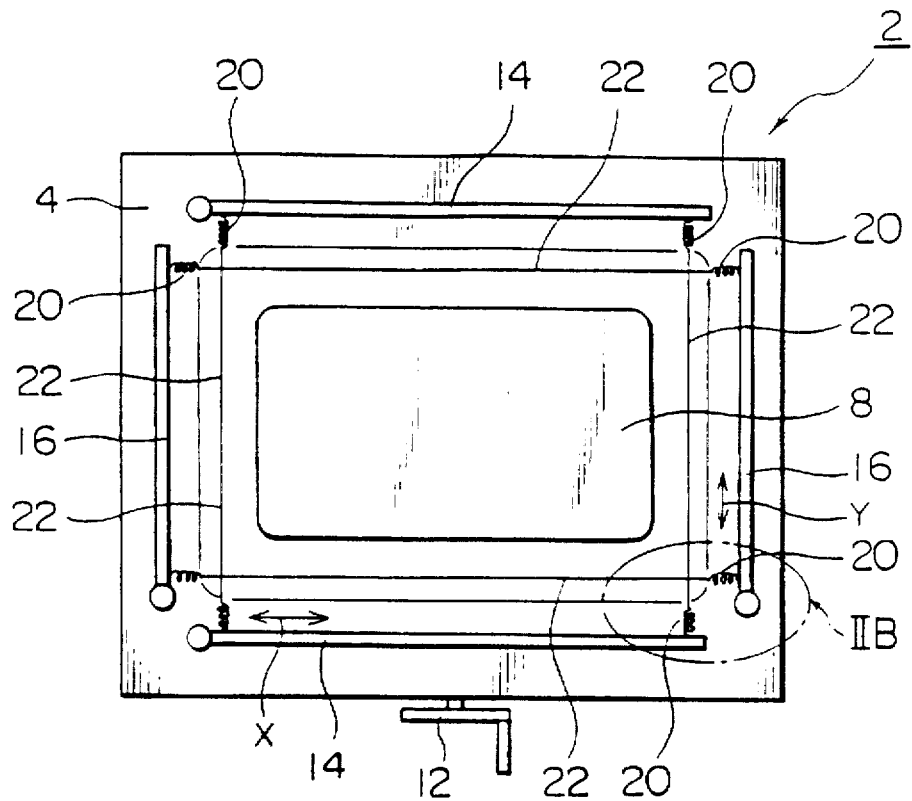
FIG. 2A is a plane view of an apparatus for splitting of a cathode ray tube according to the same embodiment.
Figure 2B:
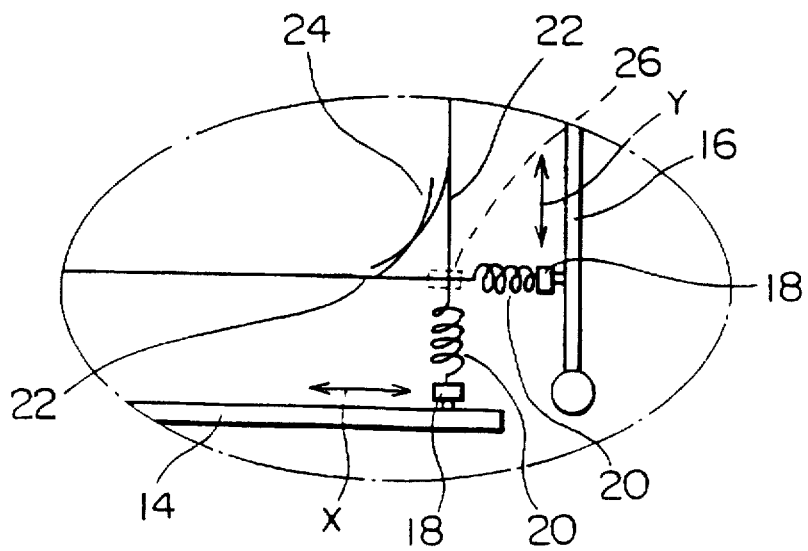
FIG. 2B is a schematic view of key portions of FIG. 2A.
Figure 3:
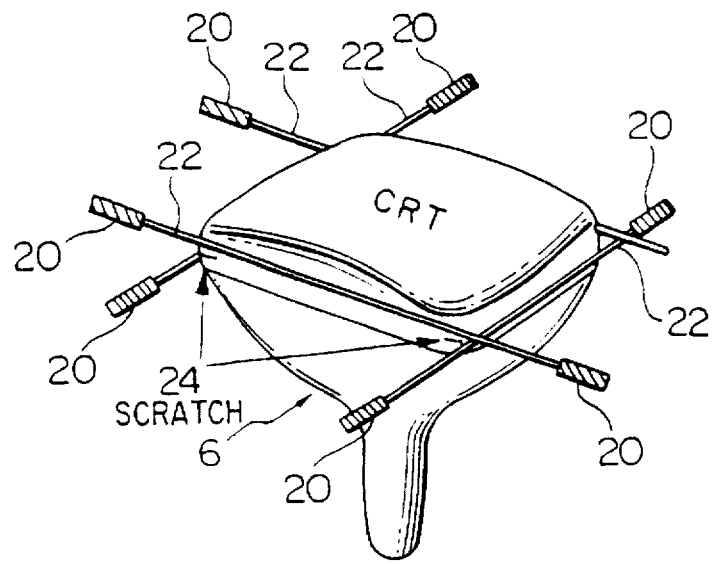
FIG. 3 is a schematic perspective view showing the relationship between the electric heating wires of the splitting apparatus of the same embodiment and the cathode ray tube.
Figure 4:
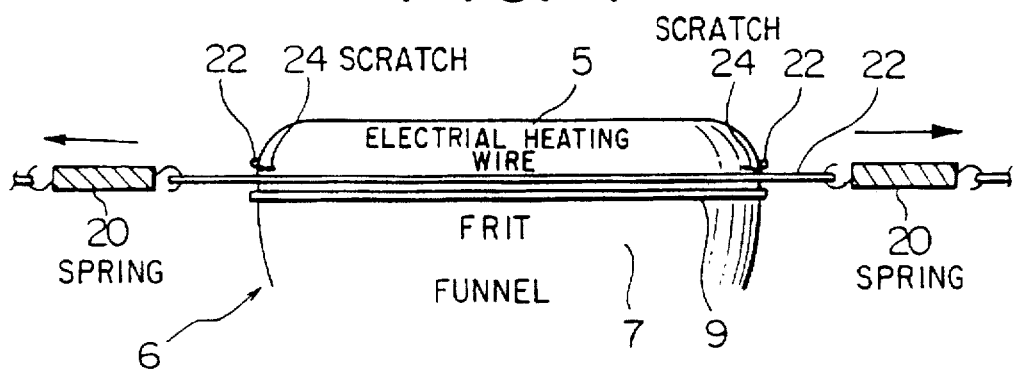
FIG. 4 is a schematic side view showing the relationship between the electric heating wires of the splitting apparatus of the same embodiment and the cathode ray tube.

By making the sliding pieces 18 shown in FIG. 2B slide along the guide rails 14 and 16, the electrical heating wires 22 slide in the arrow X and Y directions. Even if the size of the cathode ray tube to be split changes, the electrical heating wires 22 and 22 can therefore be made to contact the four side positions of the cathode ray tube in a tensioned state.

Figure 5:
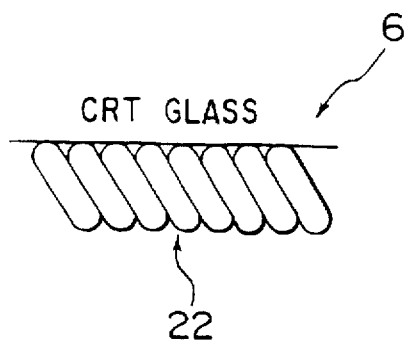
FIG. 5 is a schematic view showing an example of an electrical heating wire used in the splitting apparatus.

In the present invention, the type of the electrical heating wires 22 is not particularly limited, but as shown in FIG. 5, it is desirable that a plurality of electrical heating wires be plied together. By making electrical heating wires 22 of this wire construction, it is possible to ensure a fixed amount of heat from the electrical heating wires and possible to prevent deformation of the electrical heating wires.

Figure 1B:
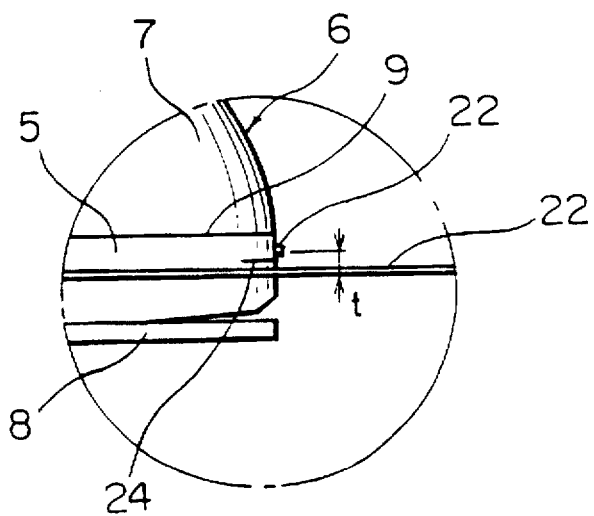
FIG. 1B is a schematic view of key portions of FIG. 1A.

The electrical heating wires 22, as shown in FIG. 1B, FIG. 2B, FIG. 3, and FIG. 4, are made to contact the four side positions of the panel portion 5 of the cathode ray tube 6, by operating the handle 12 so as to lower the elevating plate 8 carrying the cathode ray tube 6 and sliding the sliding pieces 18 along the guide rails 14 and 16, so as to flank from the two sides the scratches 24 formed at the four corners of the panel portion 5 of the cathode ray tube 6 by a later mentioned technique. As shown in FIG. 1B, at the portions where the adjoining electrical heating wires 22 intersect, the clearance t between the two electrical heating wires 22 is preferably 0.5 to 4 mm. If the clearance t is too large, there is a danger that the splitting of the cathode ray tube mentioned later cannot be performed well, so the above range is desirable.

Note that as shown in FIG. 2B, there is a danger of two electrical heating wires 22 coming into contact and short-circuiting at the portions where adjoining electrical heating wires 22 intersect, so it is desirable to attach a heat resistant insulating tube 26 as an insulation member at the outer circumference of one of the electrical heating wires at each of the intersecting portions.

The current supplied for the purpose of heating these electrical heating wires 22 and splitting the cathode ray tube 6 by the later mentioned method is preferably a constant one. The current supplied to the electrical heating wires 22 changes in accordance with the resistance of the electrical heating wires, but for example is about 15 to 20 A. Further, the voltage is 40 to 50V.

Next, an explanation will be made of the method for promoting the reutilization of resources by using the splitting apparatus 2 according to the above embodiment to split a cathode ray tube 6.

FIGS. 6A to 6F show the overall flow for reutilization of glass resources of a scrap cathode ray tube 6.

Figure 6A:
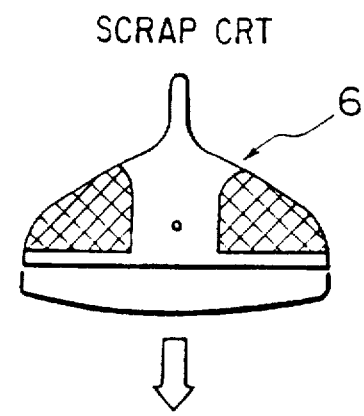
FIGS. 6A to 6F are schematic views showing the process for reutilization of resources of scrap cathode ray tubes by the method according to an embodiment of the present invention.
Figure 7:
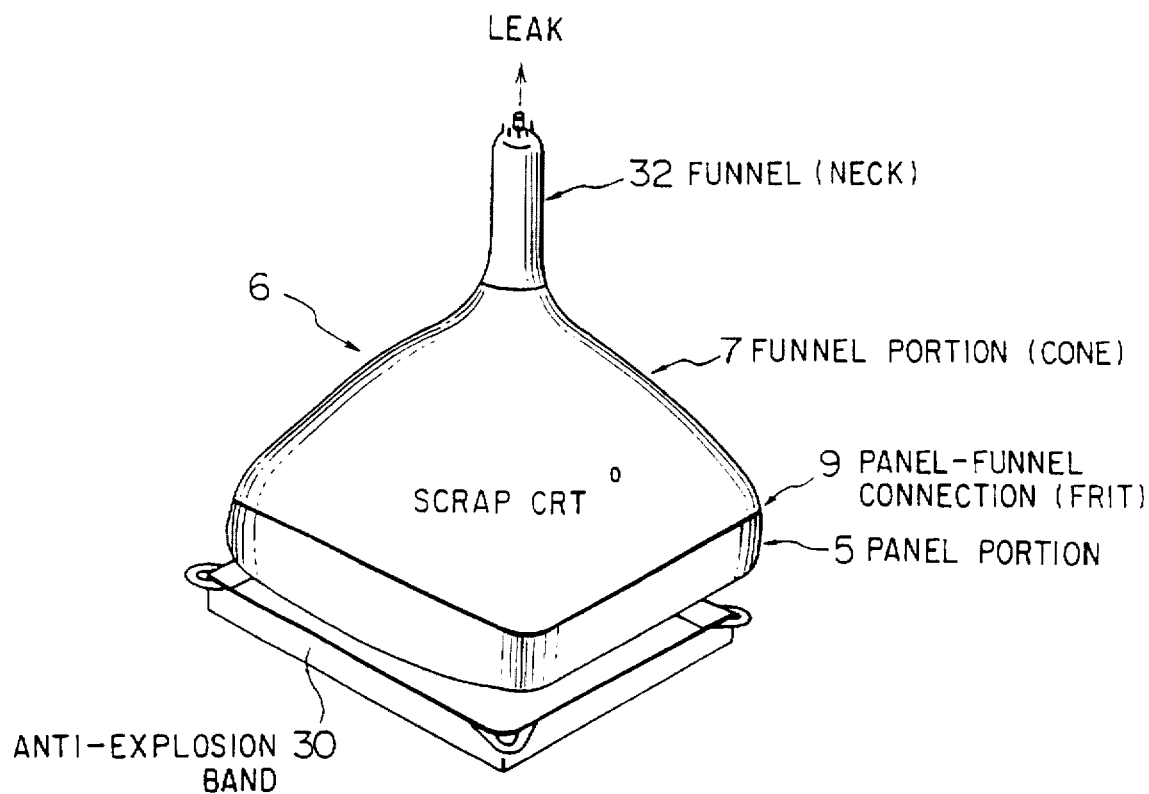
FIG. 7 is a schematic perspective view showing the steps for detachment of the anti-explosion band as advance preparation for the splitting of the scrap cathode ray tube.

First, as shown in FIG. 6A, a scrap cathode ray tube 6 is recovered. The inside of the scrap cathode ray tube 6 is held at a high vacuum, so as shown in FIG. 7, a leak is made in the cathode ray tube from the neck portion 32 of the funnel portion 7, then the anti-explosion band 30 attached to the front face of the panel portion is removed.

Figure 8:
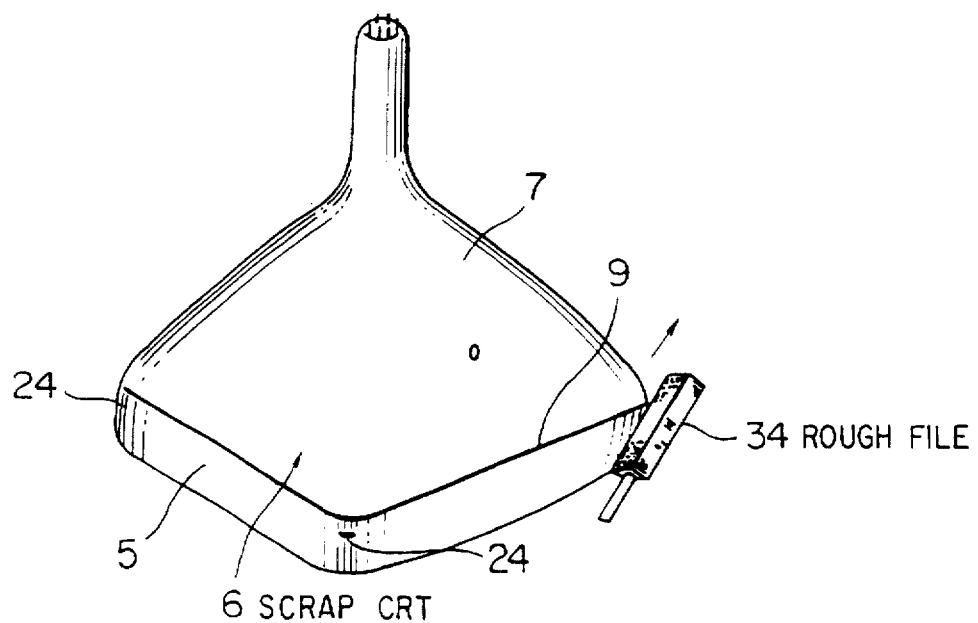
FIG. 8 is a perspective view showing the step of scratching a scrap cathode ray tube.

Next, as shown in FIG. 8, a rough file 34 etc. is used to form scratches 24 at the four corners positioned in the panel portion 5 rather than the frit glass portion 9 where the panel portion 5 and the funnel portion 7 of the cathode ray tube 6 are joined. The scratches 24 may be formed at just one of the four corners of the panel portion 5, but preferably are at all of the four corners. The depth of the scratches 24 need not be such as to penetrate to the inside of the cathode ray tube 6 and may be for example 0.1 mm or so.

Figure 6B:
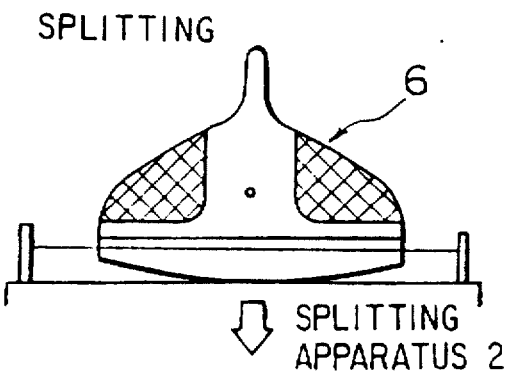

Next, the cathode ray tube 6 with the scratches 24 formed at the four corners at the panel side, as shown in FIG. 6B, is mounted in the splitting apparatus 2. In the splitting apparatus 2, the handle 12 shown in FIG. 1A is operated to lower the cathode ray tube 6 along with the elevating plate 8 so that, as shown in FIG. 1B, it is set to a position where the scratches 24 of the cathode ray tube 6 are flanked by adjoining electrical heating wires 22. Next, the sliding pieces 18 shown in FIG. 2B are slid along the guide rails 14 and 16 so that the electrical heating wires 22 press against the scratches 24 in a manner flanking them from the two sides and further applying tension to the four sides of the panel portion 5. The springs 20 attached to the two ends of the electrical heating wires 22 absorb the linear expansion of the electrical heating wires at the time of heating of the electrical heating wires at the next step.

After this, a constant current is applied to the electrical heating wires 22 at a constant voltage so as to split the cathode ray tube 6 along the electrical heating wires 22. The heating temperature of the electrical heating wires 22 is set to a temperature below the melting point of the glass constituting the cathode ray tube and a temperature which causes quick heat strain locally in the glass. The time for applying the current to the electrical heating wires 2 to split the cathode ray tube 6 is not particularly limited, but may be several tens of seconds to several minutes.

The reason why it is possible to split the cathode ray tube 6 substantially along the electrical heating wires 22 in this way by applying linear heat to the four side portions of the cathode ray tube 6 by the electrical heating wires 22 so as to flank the scratches 24 of the cathode ray tube 6 will be explained next.

Figure 9A:
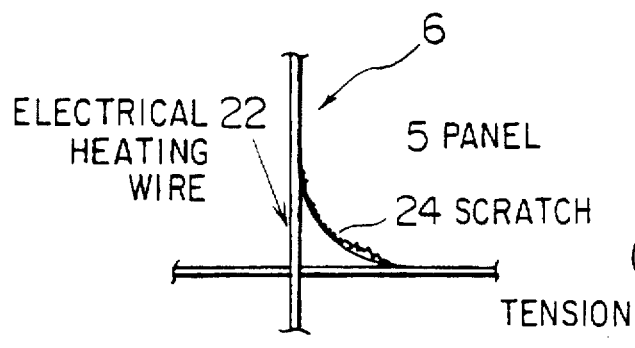
FIGS. 9A and 9B are schematic views showing the distribution of stress caused at the corners of the panel portion.
Figure 9B:
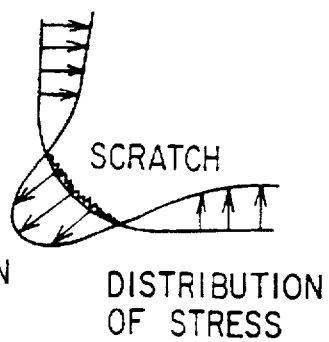

As shown in FIGS. 9A and 9B, by linearly heating the four sides of the panel portion 5 by the electrical heating wires 22, due to the local heat strain of the panel portion 5, tensile stress concentrates at the portions of the scratches 24 formed at the corners of the panel portion 5. Glass is generally weak against tensile stress, so the heating of the electrical heating wires 22 causes cracks to appear in the portions of the scratches 24 in the first few minutes (1 to 2 minutes). If the heating of the electrical heating wires 22 is further continued, as shown in FIGS. 10A and 10B, the cracks 36 spread in all directions of the panel portion 5 substantially along the electrical heating wires 22.

Figure 10A:
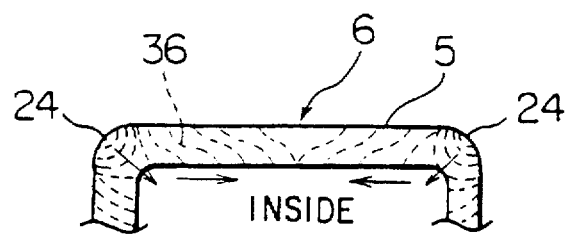
FIGS. 10A and 10B are schematic views showing the process of cracking.
Figure 10B:
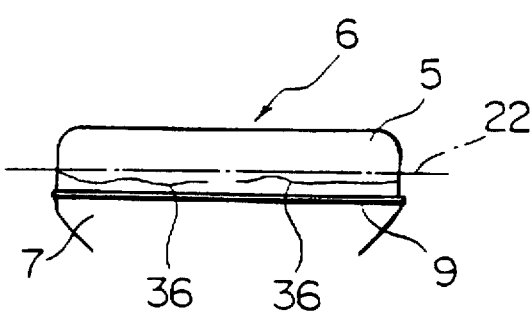

If the manner of the spread of the cracks is observed, as shown in FIGS. 10A and 10B, the cracks appearing at the scratches 24 of the corners of the panel portion 6 start from the inside of the panel portion 5 and gradually spread to the outside. The reason why the cracks appearing at the scratches 24 of the corners spread from the inside in all directions substantially along the electrical heating wires 22 can be explained as follows.

Figure 11A:
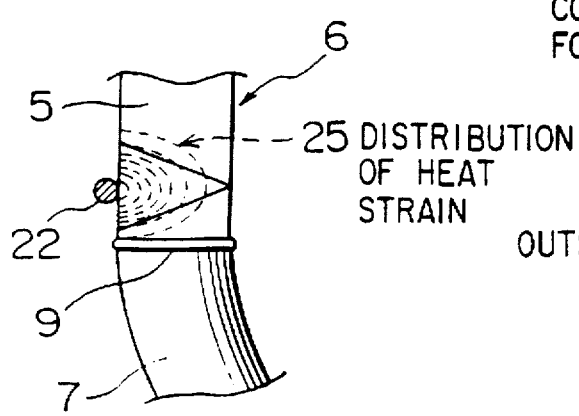
FIGS. 11A and 11B are schematic views showing the state of heat conduction from the electrical heating wires and the distribution of stress.
Figure 11B:
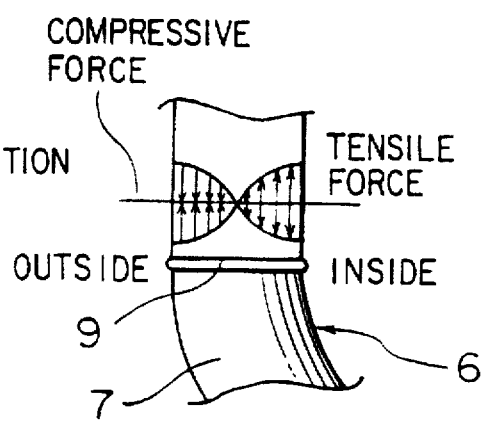

As shown in FIG. 11A, the heat from the electrical heating wires 22 is transmitted gradually to the inside from the linear panel portions in contact with the electrical heating wires 22. The distribution 25 of the heat strain caused by this heat transmission is as shown by the broken lines in FIG. 11A. Further, as shown in FIG. 11B, the distribution of the stress acting on the cross-section of the panel portion 6 features maximum tensile stress at the inside of the panel. Glass is weak against tensile stress, so it was confirmed by examination of the pattern of the cracks that the cracks advanced from the inside of the panel portion 6. Further, observing the line of splitting of the panel 6, it was confirmed by examination of the pattern of the cracks that the cracks grew from the portion of the maximum tensile stress.

Figure 12:
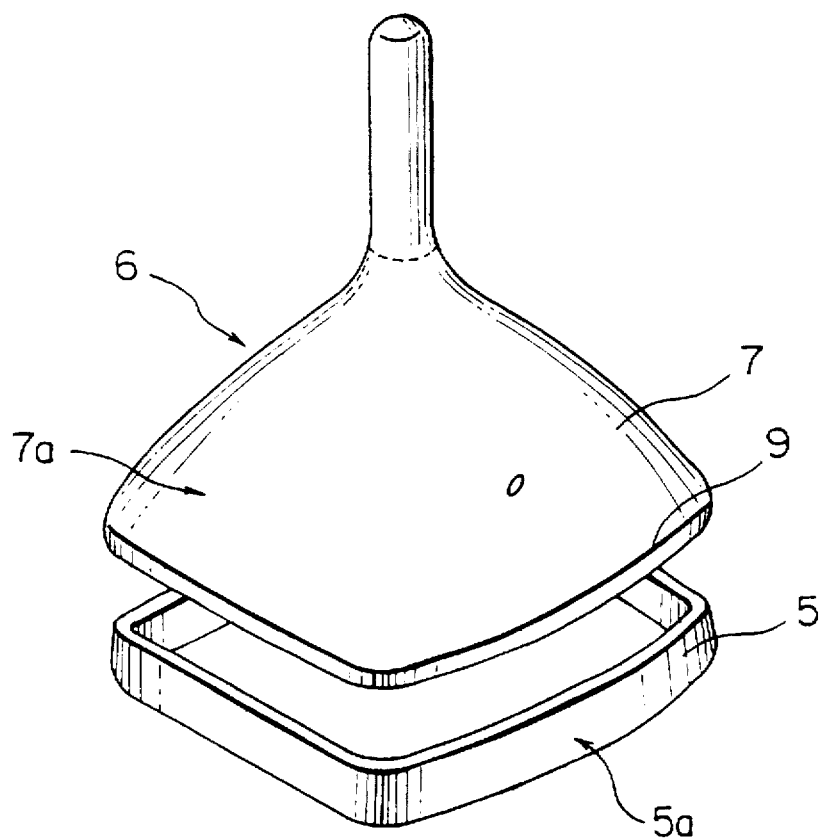
FIG. 12 is a perspective view showing the state of a cathode ray tube after splitting.

As a result of several minutes of heating by the electrical heating wires 22, the cracks which advanced from the scratches 24 formed at the corners of the panel portion 5 and spread along the longitudinal direction of the electrical heating wires 22 all connected with each other, whereupon, as shown in FIG. 12, the cathode ray tube 6 was split into the panel side glass 5a and the funnel side glass 7a at a portion positioned at the panel portion 5 side rather than the frit glass portion 9 and thus the splitting process of the panel portion was completed.

Figure 6C:
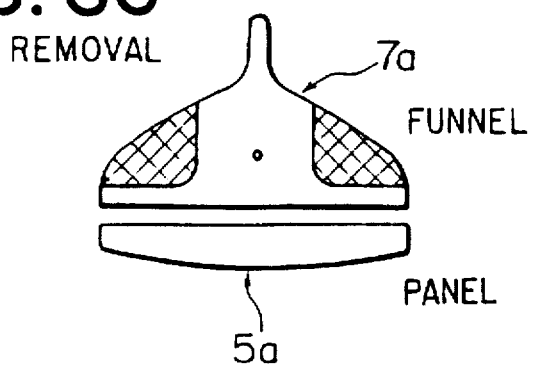
Figure 6D:
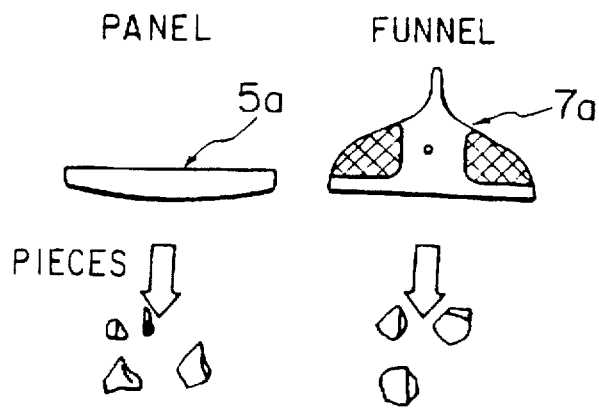
Figure 6E:
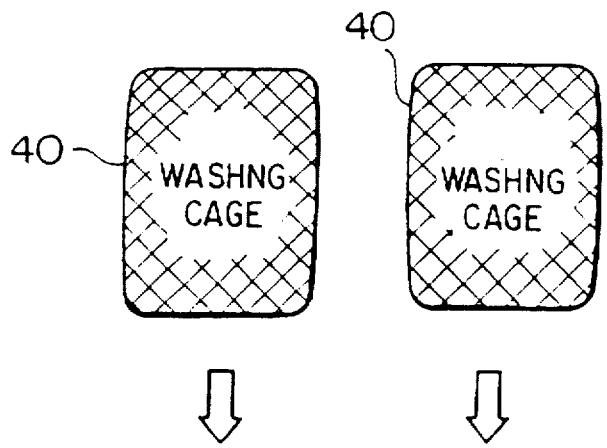
Figure 6F:
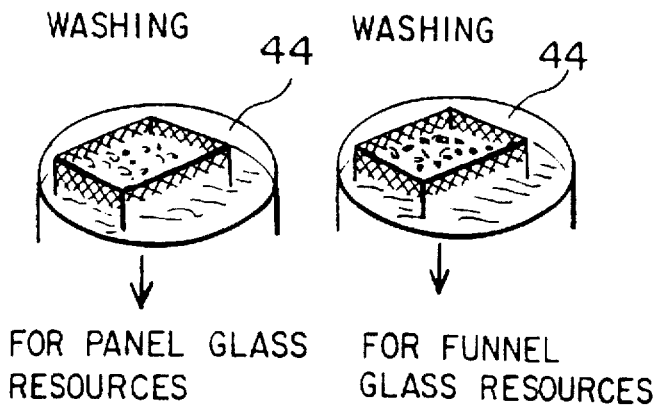

The split glass 5a and 7a are taken out from the splitting apparatus as shown in FIG. 6C and then separately smashed as shown in FIG. 6D. The pieces are placed in separate washing cages 40 and 42 as shown in FIG. 6E, then are washed by a washing apparatus 44 shown in FIG. 6F. The pieces of glass are reutilized as glass for making the panel or funnel.

Note that the present invention is not limited to the above embodiments and can be modified in various ways within the scope of the present invention.

For example, the springs 20 are for imparting tension to the electrical heating wires 22, but it is not absolutely necessary to attach them to the two ends of the electrical heating wires 22. They may be attached to just one of the ends. Further, in the above-mentioned embodiments, the guide rails 14 and 16 were affixed to the support base 4, but it is also possible to make the guide rails 14 and 16 slidable with respect to the support base, apply a spring force to the guide rails, and indirectly apply tension to the electrical heating wires.

Further, in the present invention, the position of splitting of the cathode ray tube is not limited to the panel portion side. The cathode ray tube can be split at any position. Further, in the present invention, the linear heating element is not limited to an electrical heating wire 22 and may be another linear heating element.

As explained above, according to the present invention, it is possible to split a cathode ray tube at any position. In particular, in the present invention, wherein the splitting is made at the panel portion side rather than the frit glass portion where the panel portion and the funnel portion of the cathode ray tube are joined, there is no inclusion of glass constituting the frit glass portion or the funnel glass portion at the panel portion after the splitting, so it is possible to effectively reutilize the glass of the panel portion as well.

Further, the splitting apparatus of the present invention is simple in construction, so is transportable, easy to operate, and low in cost. The method of splitting by using the splitting apparatus of the present invention does not require any large facilities and enables the splitting work to be performed without regard as to location.

Further, in a splitting apparatus of the present invention wherein the linear heating elements further have slide movement means for slide movement in a direction perpendicular to the longitudinal direction, it is possible to bring the linear heating elements into contact with the four side positions of the cathode ray tube in accordance with the size of the cathode ray tube, which is even more convenient.

In the splitting apparatus of the present invention wherein an insulation member is attached at the portions where the linear heating elements intersect, it is possible to effectively prevent short-circuiting among linear heating elements.

I claim:

1. A method for splitting a cathode ray tube comprising:
   making a scratch on at least one corner of a panel portion of the cathode ray tube;
   applying heat with heating elements in a linear manner so as to flank the scratch from both sides of the scratch;
   applying tension to said heating elements with springs;
   wherein said heating elements have slide movement capability for sliding, permitting adjustment to different size cathode ray tubes.

2. The method for splitting a cathode ray tube as set forth in claim 1, wherein said heating elements comprise a pair of electrical heating wires disposed on either side of each scratch formed on the cathode ray tube and said electrical heating wires are used to apply heat in a linear manner from both sides of each scratch.

3. A method of splitting a cathode ray tube as set forth in claim 1, wherein insulating members are attached to said heating elements at portions where said heating elements intersect.

4. The method for splitting a cathode ray tube as set forth in claim 1, wherein each scratch is positioned on a panel portion immediately above a frit glass portion where said panel portion and a funnel portion of the cathode ray tube are joined.

5. A method of splitting a cathode ray tube, said cathode ray tube having a panel portion including four sides defining four corners, comprising:
   making a scratch on at least one corner of the panel portion of the cathode ray tube, said scratch being substantially parallel to an interface between said panel portion and a funnel portion of the cathode ray tube; and
   applying heat with heating elements along two sides of the cathode ray tube adjacent to said at least one scratched corner;
   wherein said step of applying heat further comprises:
   applying a first heating element along a first side of said cathode ray tube adjacent to said scratched corner, said first heating element being applied above said scratch;
   applying a second heating element along a second side of said cathode ray tube adjacent to said scratched corner, said second heating element being applied below said scratch; and
   separating said first and second heating elements by 0.5 to 4 mm along said scratched corner.

6. A method as set forth in claim 5, further comprising insulating said first and second heating elements with a heat resistant insulating tubing which surrounds said first and second heating elements respectively at a point at which said first and second heating elements cross each other.

7. A method as set forth in claim 5, wherein said making a scratch further comprises making a scratch with a depth of approximately 0.1 mm.

8. A method as set forth in claim 5, wherein said applying comprises sliding said heating elements against said cathode ray tube, said heating elements being mounted on slidable elements to accommodate differently sized cathode ray tubes.

* * * * *